No. 782,917. PATENTED FEB. 21, 1905.
J. M. MOREHEAD.
ELECTRIC FURNACE.
APPLICATION FILED OCT. 19, 1903.

Witnesses.
R. A. Balderson
J. B. Hill

Inventor
John M. Morehead
by Bynum Townsend
Att'ys

No. 782,917.                                                    Patented February 21, 1905.

UNITED STATES PATENT OFFICE.

JOHN MOTLEY MOREHEAD, OF CHICAGO, ILLINOIS, ASSIGNOR TO UNION CARBIDE COMPANY, OF CHICAGO, ILLINOIS, A CORPORATION OF VIRGINIA.

ELECTRIC FURNACE.

SPECIFICATION forming part of Letters Patent No. 782,917, dated February 21, 1905.

Application filed October 19, 1903. Serial No. 177,603.

*To all whom it may concern:*

Be it known that I, JOHN MOTLEY MOREHEAD, a citizen of the United States, residing at Chicago, in the county of Cook and State of Illinois, have invented certain new and useful Improvements in Electric Furnaces, of which the following is a specification.

This electric furnace is especially intended for the production of calcium carbid, and is an improvement on the one described in my United States Patent No. 664,333, granted December 18, 1900. The patented furnace comprises a working chamber, a hood depending into this chamber, electrodes within, and a waste-gas outlet from the hood, and means for feeding the charge around the hood. The charge surrounding and sealing the lower end of the hood served as a seal to exclude air and direct the waste gases into the hood. I have now found that the charge may advantageously be fed directly into the hood and that the waste gases will still collect in the hood, although they are obliged to pass through a considerable body of the charge on their way to the gas-outlet. This somewhat unexpected movement of the gases upward through the charge within the hood instead of out beneath the skirt of the hood is believed to be due to the fact that the gases rising from the zone of reaction at the lower ends of the electrodes tend to work upward through the charge along the electrodes and that they will thus pass along the electrodes through a path of greater length than through the charge itself. The new construction enables the furnace to be operated with great regularity and without filling the surrounding atmosphere with dust from the finely-divided charge.

The invention will be readily understood by reference to the accompanying drawings, in which—

Figure 1:
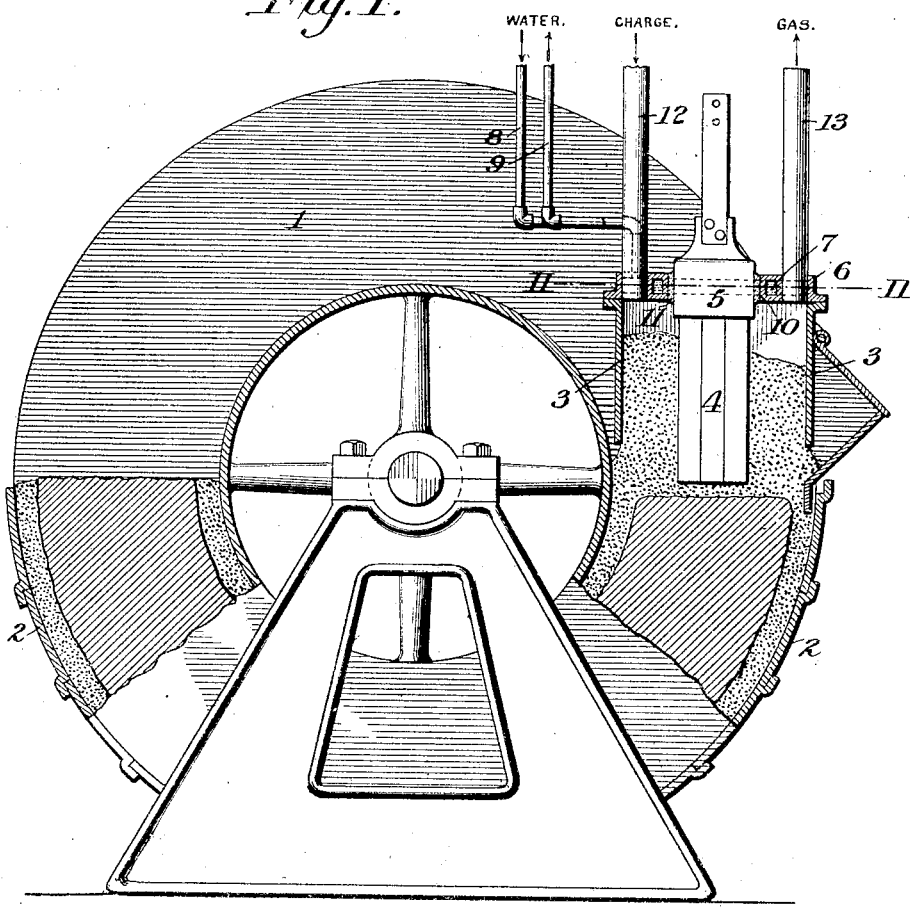
Figure 2:
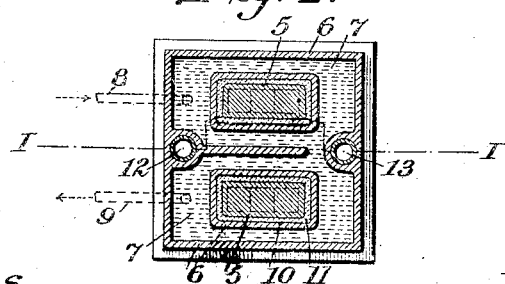

Figure 1 is a vertical central section of the furnace with parts in elevation, the section through the hood being taken on the line I I of Fig. 2; and Fig. 2 is a horizontal section through the top of the hood, taken on the line II II of Fig. 1.

The furnace chosen for illustration is of the well-known Horry type, the working chamber of which consists of a wheel 1 with removable cover-plates 2. An iron hood 3 depends into the open end of the working chamber. The depending electrodes 4 are carried in vertically-adjustable holders 5. The top of the hood is closed by a plate 6, of cast-iron, within which is a cooling-chamber 7, having a water-inlet pipe 8 and an outlet-pipe 9. Parallel openings 10 to receive the electrode-holders 5 extend vertically through this cover-plate. These openings are preferably somewhat larger than the electrode-holders, and a refractory luting 11 is filled into the intervening space when the electrodes have been adjusted to the proper height. A pipe 12 for introducing the charge leads through the top of the hood behind the electrodes, and another pipe, 13, for withdrawing the waste gases leads from the hood in front of the electrodes.

In operation the electrodes are adjusted to the proper height and the charge is fed in through pipe 12 until it fills a considerable portion of the hood, and thus seals its lower end. The depth of the seal may be increased, if necessary, by pulling some of the charge outward beneath the skirt of the hood. Water is continuously circulated through the cover during the operation of the furnace, and the waste carbon monoxid quietly escapes through the pipe 13.

It is obvious that a hood of this construction may advantageously be employed in electric furnaces of other types and for the production of other materials than calcium carbid.

I claim—

1. An electric furnace, comprising a working chamber, a hood depending into said chamber, electrodes within said hood, and means for introducing the charge into the hood, as set forth.

2. An electric furnace, comprising a working chamber, a hood depending into said chamber, electrodes within said hood, and means for introducing the charge into the hood and withdrawing the waste gases from the hood, as set forth.

3. An electric furnace, comprising a working chamber, a hood depending into said chamber, electrodes passing through openings in said hood, and means for introducing the charge into the hood, as set forth.

4. An electric furnace, comprising a working chamber, a hood depending into said chamber, electrodes passing through openings in said hood, and means for introducing the charge into the hood and withdrawing the waste gases from the hood, as set forth.

5. An electric furnace, comprising a working chamber, a hood depending into said chamber, means for cooling the top of said hood, an electrode or electrodes passing through openings in said top, and means for introducing the charge into the hood, as set forth.

6. An electric furnace, comprising a working chamber, a hood depending into said chamber, means for cooling the top of said hood, an electrode or electrodes passing through openings in said top, and means for introducing the charge into the hood and withdrawing the waste gases from the hood, as set forth.

In testimony whereof I affix my signature in presence of two witnesses.

JOHN MOTLEY MOREHEAD.

Witnesses:
J. S. JACKSON,
F. G. FULLER.